United States Patent
Asayag et al.

(10) Patent No.: US 12,282,788 B2
(45) Date of Patent: Apr. 22, 2025

(54) RECOVERABLE CONTAINER PLATFORM CLUSTER FOR TESTING

(71) Applicant: RED HAT, INC., Raleigh, NC (US)

(72) Inventors: Mordechay Asayag, Netanya (IL); Boris Odnopozov, Tel-Aviv (IL); Jakub Michal Dżon, Bęczyn (PL)

(73) Assignee: Red Hat, Inc., Raleigh, NC (US)

( * ) Notice: Subject to any disclaimer, the term of this patent is extended or adjusted under 35 U.S.C. 154(b) by 611 days.

(21) Appl. No.: 17/360,127

(22) Filed: Jun. 28, 2021

(65) Prior Publication Data
US 2022/0413887 A1    Dec. 29, 2022

(51) Int. Cl.
G06F 9/455    (2018.01)
G06F 9/50    (2006.01)

(52) U.S. Cl.
CPC ........ *G06F 9/45558* (2013.01); *G06F 9/5072* (2013.01); *G06F 2009/4557* (2013.01); *G06F 2009/45595* (2013.01)

(58) Field of Classification Search
CPC ............... G06F 9/45558; G06F 9/5072; G06F 2009/4557; G06F 2009/45595; G06F 9/45512; G06F 2009/45562; G06F 2009/45575; G06F 2009/45587
See application file for complete search history.

(56) References Cited

U.S. PATENT DOCUMENTS

| | | | |
|---|---|---|---|
| 8,769,226 B2 | 7/2014 | Wilk | |
| 9,032,133 B2 | 5/2015 | Schmidt et al. | |
| 10,503,543 B1* | 12/2019 | Bhat | G06F 9/5077 |
| 10,963,349 B2 | 3/2021 | Dhamdhere et al. | |
| 2013/0036328 A1* | 2/2013 | Mutisya | G06F 8/65 717/172 |
| 2020/0026810 A1* | 1/2020 | Subramaniam | G06F 9/5094 |
| 2020/0034245 A1* | 1/2020 | Kohler | G06F 11/1458 |
| 2021/0026675 A1* | 1/2021 | Hadas | G06F 9/5077 |
| 2021/0103563 A1* | 4/2021 | Thirumalai | G06F 11/3055 |
| 2021/0216406 A1* | 7/2021 | Silverstein | G06F 11/3055 |
| 2021/0234872 A1* | 7/2021 | Mitra | H04L 63/1416 |

FOREIGN PATENT DOCUMENTS

| | | |
|---|---|---|
| CN | 104111878 A | 10/2014 |
| CN | 108959547 A | 12/2018 |
| CN | 109542841 A | 3/2019 |

OTHER PUBLICATIONS

Cui, L. et al. (Nov. 3-8, 2013). "HotSnap: A Hot Distributed Snapshot System for Virtual Machine Cluster," Beihang University, pp. 16.

* cited by examiner

*Primary Examiner* — Sisley N Kim
(74) *Attorney, Agent, or Firm* — Womble Bond Dickinson (US) LLP

(57) ABSTRACT

A method includes deploying a containerized execution environment on a cluster of virtual machines and performing a snapshot on each virtual machine in the cluster of virtual machines to save a first version of the containerized execution environment on the cluster. The method further includes performing a test on the containerized execution environment and reverting each virtual machine of the cluster of virtual machines to the first version of the cluster saved by the snapshot in view of the test.

20 Claims, 5 Drawing Sheets

RECOVERABLE CONTAINER PLATFORM CLUSTER FOR TESTING

TECHNICAL FIELD

Aspects of the present disclosure relate to virtualized execution platforms, and more particularly, a recoverable container platform cluster for software testing.

BACKGROUND

In a virtualized execution environment, a hypervisor abstracts the physical resources of a computing device such as physical processing devices (e.g., processors, CPUs, etc.) and physical memory (e.g., RAM) into virtual resources. The hypervisor manages and assigns the virtual resources to virtual machines (VMs) running on the computing device. Additionally, in a containerized execution model, an application and its dependencies (such as binaries and/or libraries that as necessary to run the application) run within the application container, which is an isolated process in the user space of the host operating system, sharing the kernel with other containers.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
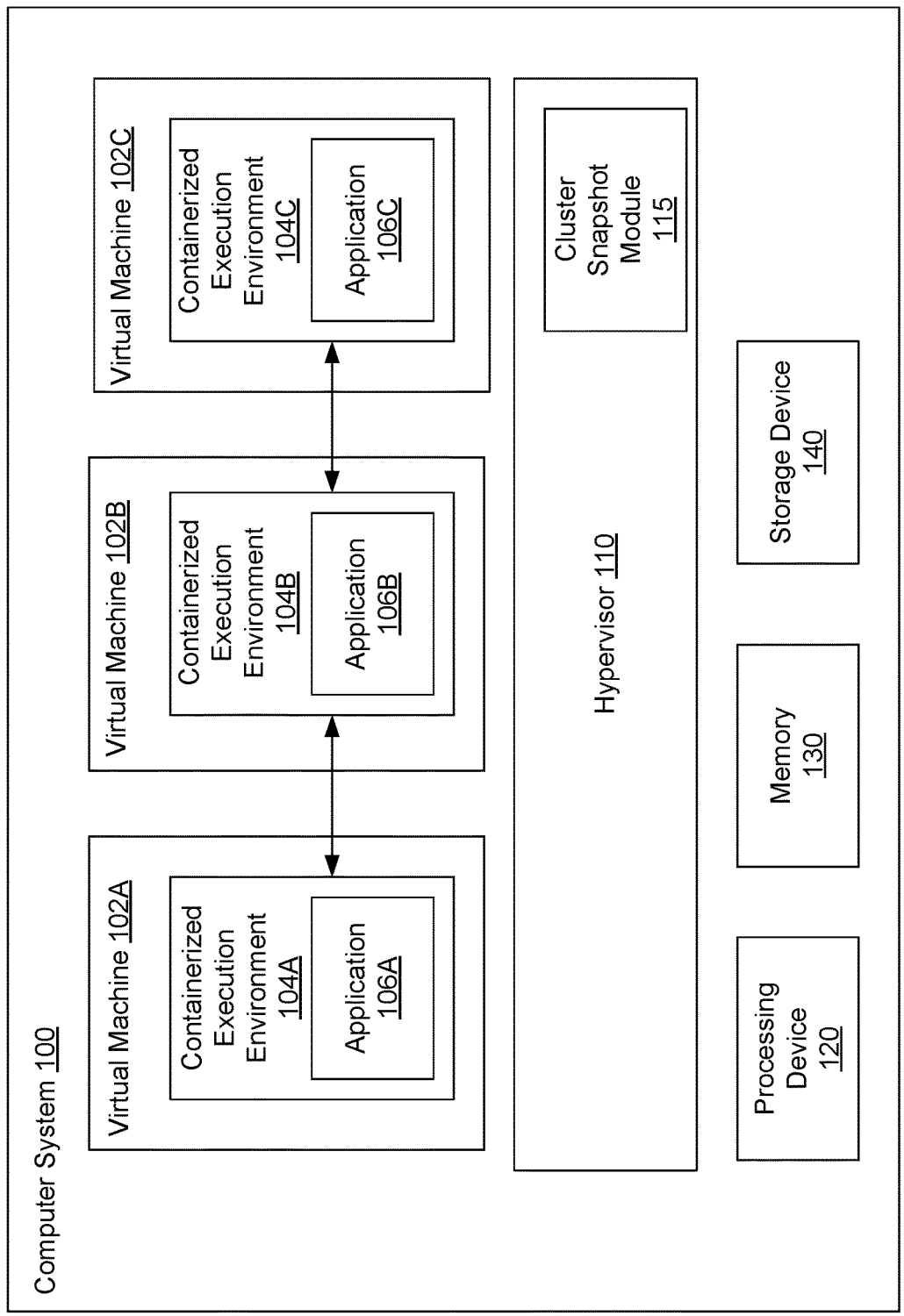
FIG. 1 is a system diagram that illustrates an example system including a recoverable containerized cluster for application testing, in accordance with embodiments of the disclosure.

A software test-suite for running tests on software applications may be deployed in a virtualized execution environment, such as within a containerized cluster. In some instances, a containerization platform may be deployed on a cluster of computing nodes, such as a cluster of virtual machines (VMs), a cluster of physical computing nodes, or a combination of such. When running a test-suite, which may consist of many tests, may enter into a non-operational state or the testing developer may wish to run several tests from the same beginning state of the container platform. Recovering from a broken cluster might be too complex to handle either via automation or manually, necessitating the re-provisioning of the cluster. Re-provisioning of the cluster, however, may take a substantial amount of time (e.g., more than one hour).

In some scenarios, a developer may wish to test upgrade scenarios of particular versions of the application (e.g., the containerized cluster or the version of an application installed on the containerized cluster) of a matrix of target versions. Upgrade scenarios, however, may not support downgrading, or reverting, the version of the cluster or the application to a previous version. Therefore, there is no path to restore the cluster to the version prior to the particular tested upgrade. Accordingly, to test additional upgrade versions, the cluster may need to be re-provisioned and re-deployed, which may take a long time (e.g., more than one hour), limiting the number of upgrade versions that can be tested over a period of time.

Aspects of the disclosure address the above-noted and other deficiencies by providing a method of recovering a containerization platform cluster. In one example, a containerization platform may be deployed on a cluster of computing nodes (e.g., VMs). Additionally, one or more applications may further be deployed on the containerization platform. Upon initialization of the containerization platform on the cluster, processing logic (e.g., a hypervisor, a master node, or other component) may stop execution of each of the computing nodes and initiate an individual snapshot for each of the nodes of the cluster. As such, a first version of the entire containerization platform may be saved by the collection of snapshots (referred to herein as a "master snapshot") of each individual computing node on which the containerization platform is deployed. Additional snapshots may be performed at different times in the life-cycle of the containerization platform. For example, another snapshot may be performed on all the computing nodes after one or more additional applications are installed on the containerization platform. Accordingly, different versions of the containerization platform may be saved for future reversions of the containerization platform.

After performing the one or more snapshots of the computing nodes, if the platform encounters an error (e.g., a non-operational state) then the computing nodes may be reverted, either manually or automatically, to a previous version of the platform using one of the master snapshots. Additionally, after completion of a test of an upgrade version of the platform or other application, the computing nodes may be reverted to a previous version to allow performance of tests on an additional upgrade version. To revert the computing nodes of the cluster to a previous version of a master snapshot, processing logic stops execution of each of the computing nodes. The processing logic then reverts each computing node to the state of the computing node saved by the snapshot. Each of the computing nodes are then started again from the state of the snapshot. In some instances, the computing nodes as reverted may include minor operational errors. Thus, the processing logic may perform one or more scripts to reconcile the state of each of the computing nodes of the cluster to restore an operational state of the version of the containerization platform to which the cluster has been reverted.

Embodiments of the present disclosure provide advantages over conventional methods including reduced iterative upgrade version testing time. Because reverting to the snapshot of the computing nodes requires significantly less time than a full re-provisioning of the platform, many more application versions can be tested in a much shorter period of time. Additionally, fewer computing resources (i.e., compute cycles, CPU utilization, etc.) may be used to revert the cluster to the previous version than performing a full re-provisioning of the cluster.

FIG. 1 is a computer system 100 for a recoverable containerization platform cluster for application testing. Computer system 100 may include one or more physical computing resources such as processing device 120, memory 130 and storage device 140. Although a single processing device, memory, and storage device is depicted for simplicity, computer system 100 may include a plurality of processing devices, memory, and storage devices. Memory 130 may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.) Storage device 140 may include one or more magnetic hard disk drives, a Peripheral Component Interconnect [PCI] solid state drive, a Redundant Array of Independent Disks [RAID] system, a network attached storage [NAS] array, etc.

Computer system 100 may execute one or more virtual machines 102A-C. A virtual machine may be a software implementation of a machine that executes programs as though it was an actual physical machine. Hypervisor 110 may manage execution of virtual machines 102A-C and provision computing resources of computer system 100 to execute the virtual machines 102A-C. The hypervisor 110 (which may also be known as a virtual machine monitor (VMM)), may provide a virtual operating platform for virtual machines 102A-C and manages their execution. Hypervisor 110 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 115, though typically implemented in software, may emulate and export a bare machine interface to higher level software in the form of virtual processors and guest memory. Hypervisor 115 may be included within an operating system of computer system 100 or without an operating system.

The containerized execution environment 104A-C may then deploy the containerized execution environment 104A-C across the virtual machines 102A-C. Additionally, one or more applications 106A-C may be installed on top of the containerized execution environment 106A-C. The applications 106A-C may be may include additional software development tools such as container-native virtualization, container storage applications, or any other applications to support development within the containerized execution environment. In one example, the applications 106A-C may be applications being developed and tested within the containerized execution environment 104A-C.

In one example, the hypervisor 110 may include a cluster snapshot module 115. Cluster snapshot module 115 may also be included in one or more of the virtual machines 102A-C or containerized execution environment 104A-C. The cluster snapshot module 115 may perform a snapshot of each of the virtual machines 102A-C on which the containerized execution environment 104-C is deployed. Accordingly, the cluster snapshot module 115 may save a state of each of the virtual machines 102A-C at a given time, thus saving the state, or version, of the containerized execution environment 104A-C at that point in time. In response to an un-operational state or completion of a test of an upgrade, the cluster snapshot module 115 may then revert each of the virtual machines 102A-C on which the containerized execution environment 104A-C is deployed to the state, or version, of the snapshot. A snapshot of a virtual machine may be a saved state of the virtual machine at a point during execution. For example, a copy-on-write volume may be generated for the virtual machine which may save the state of the virtual machine and may be reverted to at a later point in time. In another example, a snapshot may be a full copy of the virtual machine image at point in time. Any other snapshot generation method may also be used according to embodiments of the present disclosure.

Figure 2:
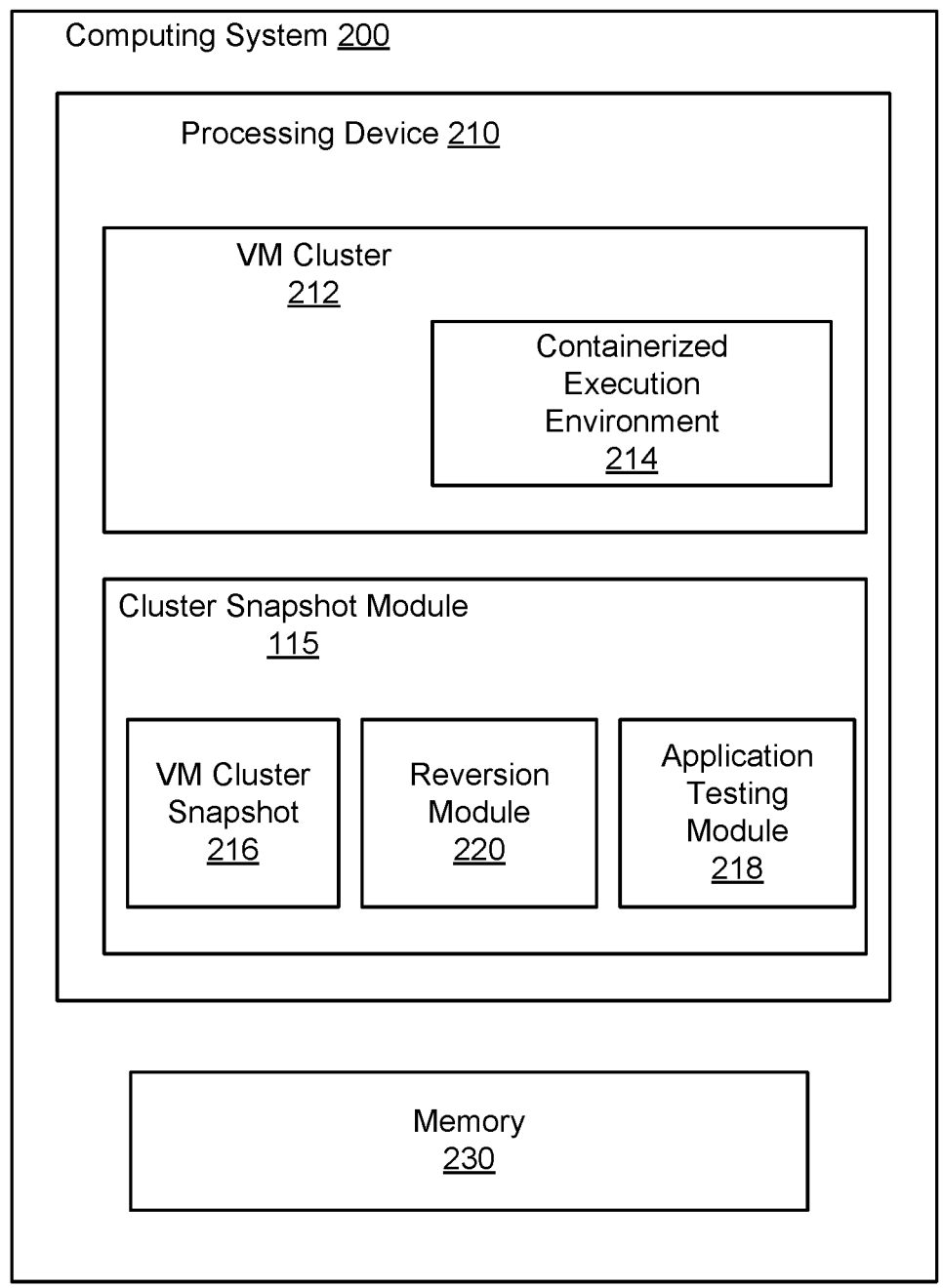
FIG. 2 is a block diagram that illustrates another example of a system including a recoverable containerized cluster for application testing, in accordance with embodiments of the disclosure.

FIG. 2 is a block diagram illustrating a computer system 200 for related change analysis across multiple repositories, in accordance with some embodiments. Computing system 200 may include a processing device 210 and memory 230. Memory 230 may include volatile memory devices (e.g., random access memory (RAM)), non-volatile memory devices (e.g., flash memory) and/or other types of memory devices. The processing device 210 may execute a virtual machine (VM) cluster 212 on which a containerized execution environment 214 may be deployed. The processing device 210 may include a cluster snapshot module 115 which may generate a VM cluster snapshot 216 and may further include reversion module 220 and application testing module 218. The cluster snapshot module 115 may be the same, or similar, to cluster snapshot module 115 as described with respect to FIG. 1.

In one example, the cluster snapshot module 115 may perform a snapshot on the VM cluster 212 on which the containerized execution environment 214 is deployed. The cluster snapshot module 115 may stop execution of each of the VMs in the VM cluster 212 and initiate a snapshot on each of the VMs in the VM cluster 212. Thus, the collection of the individual snapshots of each VM may be associated together as a VM cluster snapshot 216. The VM cluster snapshot 216 may therefore include a state, or version, of the containerized execution environment 214 at a point in time. In one example, the cluster snapshot module 115 may initiate the VM cluster snapshot 216 at multiple points in time. For example, the cluster snapshot module 115 may initiate the VM cluster snapshot 216 after the containerized execution environment 214 has been deployed on the VM cluster 212 and each time a new application is installed on the containerized execution environment 214. Thus, cluster snapshot module 115 may store several different versions of the containerized execution environment 214 as deployed on the VM cluster 212.

In one example, reversion module 220, which may be included in the cluster snapshot module 115 or as a separate component, may determine that the VM cluster 212 is to be reverted to one of the VM cluster snapshots 216. For example, the reversion module 220 may determine to revert the VM cluster 212 in response to detecting a non-operational state of the containerized execution environment 214 or VM cluster 212. In another example, the reversion module 220 may determine to revert the VM cluster 212 in response to completion of one or more tests on the containerized execution environment 214 or applications installed on the containerized execution environment 214. For example, application testing module 218 may perform tests on applications installed within the containerized execution environment 214 or installed applications. The application testing module 218 may include a test-suite including several software testing and/or debugging tools for testing applications within the containerized execution environment 214. In another example, the application testing module 218 may identify to which VM cluster snapshot 216 that the reversion module 220 should revert the VM cluster 212 based on the tests being performed. For example, each test may define the point in time (i.e., the VM cluster snapshot 216) to which the reversion module should revert the VM cluster 212.

To revert the VM cluster 212, the reversion module 220 may stop execution of each of the VMs in the VM cluster 212. The reversion module 220 may then revert each individual VM of the VM cluster 212 to its corresponding snapshot of the VM cluster snapshot 216. Once the reversion module 220 has reverted each VM to the state of the selected snapshot, the reversion module 220 may restart execution of the VMs. In some instances, however, operational errors may have occurred during the snapshot and reversion process (e.g., time drift, expired certificate, etc.) that may need to be remediated for proper operation of the containerized execution environment 214. Thus, the reversion module 220 may also execute one or more scripts upon restarting the VM cluster 212 to remediate any such errors. Particularly, the scripts may identify any errors of a node (i.e., VM) communicating with other nodes of the VM cluster 212. The scripts may identify the cause of an error and remediate the error to ensure that each node of the VM cluster 212 is operational and can properly communicate with each of the other nodes in the VM cluster 212.

Figure 3:
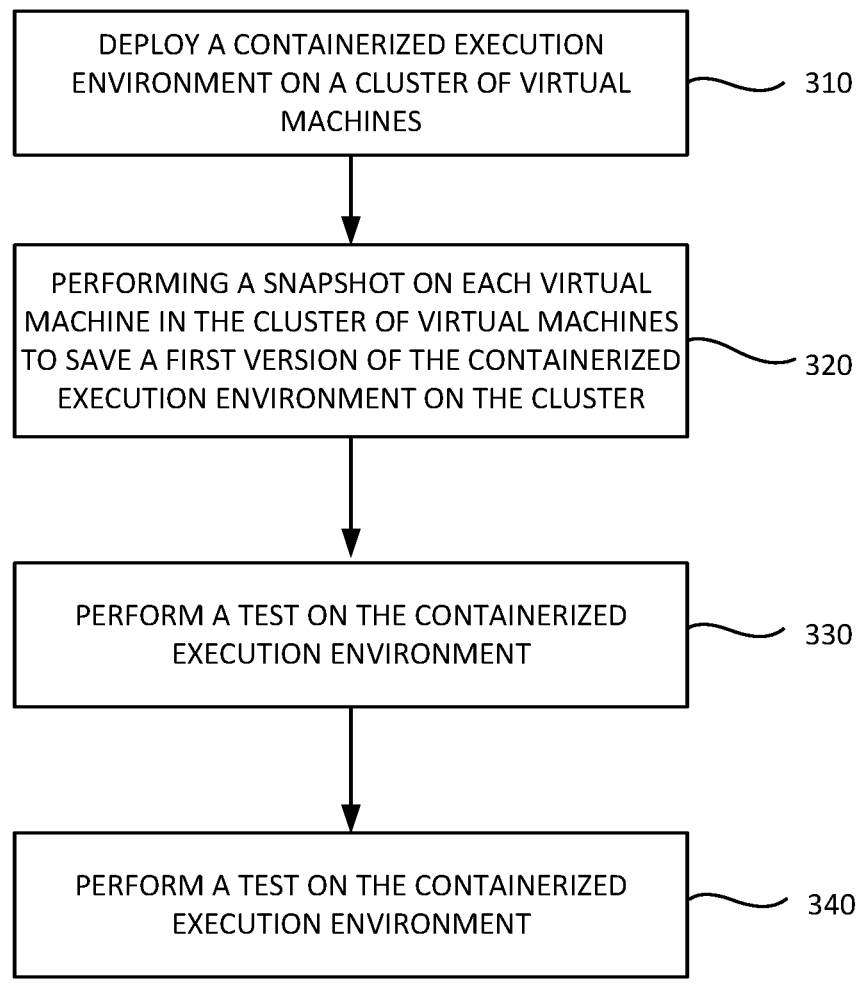
FIG. 3 is a flow diagram of method of a recoverable containerized cluster for application testing, in accordance with embodiments of the disclosure.

FIG. 3 is a flow diagram of a method 300 of providing a recoverable containerized cluster for application testing, in accordance with some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 300 may be performed by a cluster snapshot module 115 of FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

Method 300 begins at block 310, where processing logic deploys a containerized execution environment on a cluster of virtual machines. The cluster of virtual machines may be provisioned particularly to deploy the containerized execution environment. In one example, one or more nodes of the cluster act as a master node and manages operation of the other nodes of the cluster. The containerized execution environment may then be installed on top of the cluster of virtual machines using an installation service. In another example, additional applications may be installed on the containerized execution environment.

At block 320, the processing logic performs a snapshot on each virtual machine in the cluster of virtual machines to save a first version of the containerized execution environment on the cluster. In one example, the processing logic may stop execution of each of the virtual machines in the cluster prior to performing the snapshot to save a consistent state of the containerized execution environment as deployed on the cluster of virtual machines. In some scenarios, the processing logic may perform additional snapshots on the cluster at different points in time. For example, the processing logic may perform a snapshot of the cluster after deploying the containerized execution environment, after each additional application or group of applications are installed on the containerized execution environment, at operational/testing checkpoints, or any at any other time.

At block 330, the processing logic performs a test on the containerized execution environment. In one example, the containerized execution environment 214 may include or be associated with a test-suite for testing applications deployed in the containerized execution environment. Thus, processing logic may perform tests on applications in the environment which may result in a non-operational state of the containerized execution environment. Additionally, in some examples, many different upgrade versions of an application may be tested (i.e., each of several potential upgrade versions). Thus, the containerized execution environment may need to iteratively be returned to the same state for many testing scenarios.

At block 340, the processing logic reverts each virtual machine (VM) of the cluster of VMs to the first version of the cluster saved by the snapshot in view of the test. The processing logic may stop execution of each of the virtual machines in the cluster. The processing logic may identify the cluster snapshot associated with the first version of the cluster. The processing logic may then revert each of the virtual machines to the state of the snapshot for the virtual machine corresponding to the first version of the cluster. Thus, each virtual machine is individually reverted to its own snapshot state resulting in the cluster being collecting reverted to the first version of the cluster. In some examples, the processing logic may then apply a remediation script to the cluster to fix any errors of the cluster that may have occurred during the process of pausing, snapshotting, and reverting the virtual machines. For example, the remediation script may compensate for time drift, expired certificates, or other networking errors of one or more of the virtual machines of the cluster. Thus, the processing logic reverts the containerized execution environment, as deployed on the cluster of virtual machines, to a previous state (i.e., the first version) without re-provisioning of the cluster. In some examples, the processing logic may select one of the multiple cluster snapshot to revert the cluster.

Figure 4:
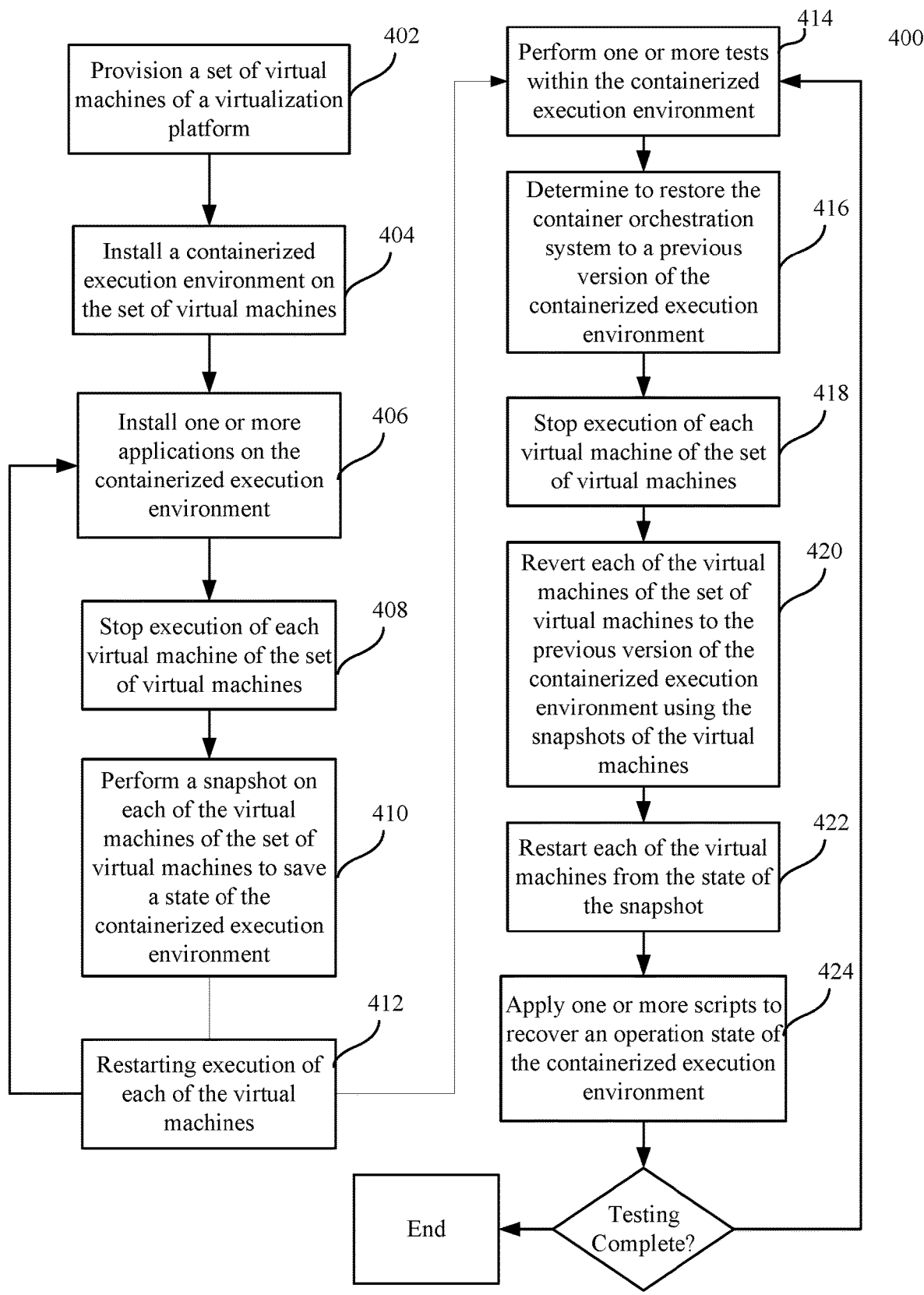
FIG. 4 is a flow diagram of a method of recovering a containerized cluster for application testing from a cluster snapshot, in accordance with embodiments of the disclosure.

FIG. 4 is a flow diagram of a method 400 of recovering a containerized cluster for application testing from a cluster snapshot, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by cluster snapshot module 115 of FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 402, where the processing logic provisions a set of virtual machines of a virtualization platform. The set of virtual machines may be a cluster of virtual machines in communication with each other. In one example, the set of virtual machines may be allocated form a pool of instantiated virtual machines. In another example, the set of virtual machines may be instantiated specifically for the requirements of a containerized execution environment. For example, an administrator may define the resources to be included in the cluster of virtual machines.

At block 404, the processing logic installs a containerized execution environment on the set of virtual machines. An installation service may identify the virtualization platform used to instantiate and manage the virtual machines and install the containerized execution environment accordingly. The processing logic may identify which of the virtual machines is a master node and which are slave nodes and install the containerized execution environment on the cluster in view of the identification. For example, a container orchestration system of the containerized execution environment may be installed at the master node for management and deployment of containerized applications across the master node and the slave nodes of the cluster.

At block 406, the processing logic installs one or more applications on the containerized execution environment. The one or more applications may include additional software development tools such as container-native virtualization, container storage applications, or any other applications to support development within the containerized execution environment.

At block 408, the processing logic stops execution of each virtual machine of the set of virtual machines. In one example, the processing logic (e.g., a hypervisor, virtualization manager, or the like) may pause each virtual machine at a particular point in time to allow a consistent snapshot to be performed across the entire cluster of virtual machines. At block 410, the processing logic performs a snapshot on each of the virtual machines of the set of virtual machines to save a state of the containerized execution environment. The processing logic may associate each of the individual snapshots of the virtual machines together into a cluster snapshot (i.e., a master snapshot).

At block 412, the processing logic restarts execution of each of the virtual machines. Each of the virtual machines may therefore begin executing again from the state of the virtual machines at which they were paused at block 408. As depicted, the processing logic may return to block 406 if additional applications are to be installed. Thus, several different snapshots of the cluster can be performed at different levels of installation and at different times during operation.

At block 414, the processing logic performs one or more tests within the containerized execution environment. In one example, the one or more tests may include a set of automated tests for testing an application installed at step 406. For example, a web-server may be installed at step 406. Then at block 414, the one or more tests may test whether the web-server is accessible and operational. The one or more tests may further include tests for testing any other type of application installed on the containerized execution environment at step 406.

At block 416, the processing logic determines to restore the containerized execution environment to a previous version. In one example, the processing logic may identify the previous version of the containerized execution environment from several different previous versions (i.e., several different snapshots from different points in time and levels of installation). In one example, the tests performed at block 414 may indicate the previous version to which the processing logic is to revert the cluster and the containerized execution environment. In another example, a default version (i.e., a default snapshot) may be reverted to upon detection of an un-operation state of the cluster or the containerized execution environment.

At block 418, the processing logic stops execution of each virtual machine of the set of virtual machines. At block 420, the processing logic reverts each of the virtual machines of the set of virtual machines to the previous version of the containerized execution environment using the snapshots of the virtual machines. At block 422, the processing logic restarts each of the virtual machines from the state of the snapshot.

At block 424, the processing logic applies one or more scripts to the set of virtual machines to recover an operational state of the containerized execution environment. In one example, the one or more scripts may perform steps to ensure the cluster is recovered and usable. For example, the scripts may attempt to connect to an API server (e.g., a cluster control plane) to determine if the API is responsive. The scripts may further verify that the certificates of each of the nodes are valid. If the certificates are not valid, the script may issue and approve new certificates to be accepted to join the cluster. The scripts may further wait for each of the nodes of the cluster to become operational and ensure that all API services of the containerized execution environment are running. The scripts may also restart applications (e.g., pods) that are not running or operational. If additional tests are to be performed, the processing logic returns to block 414 to perform additional tests of applications within the containerized execution environment.

Figure 5:
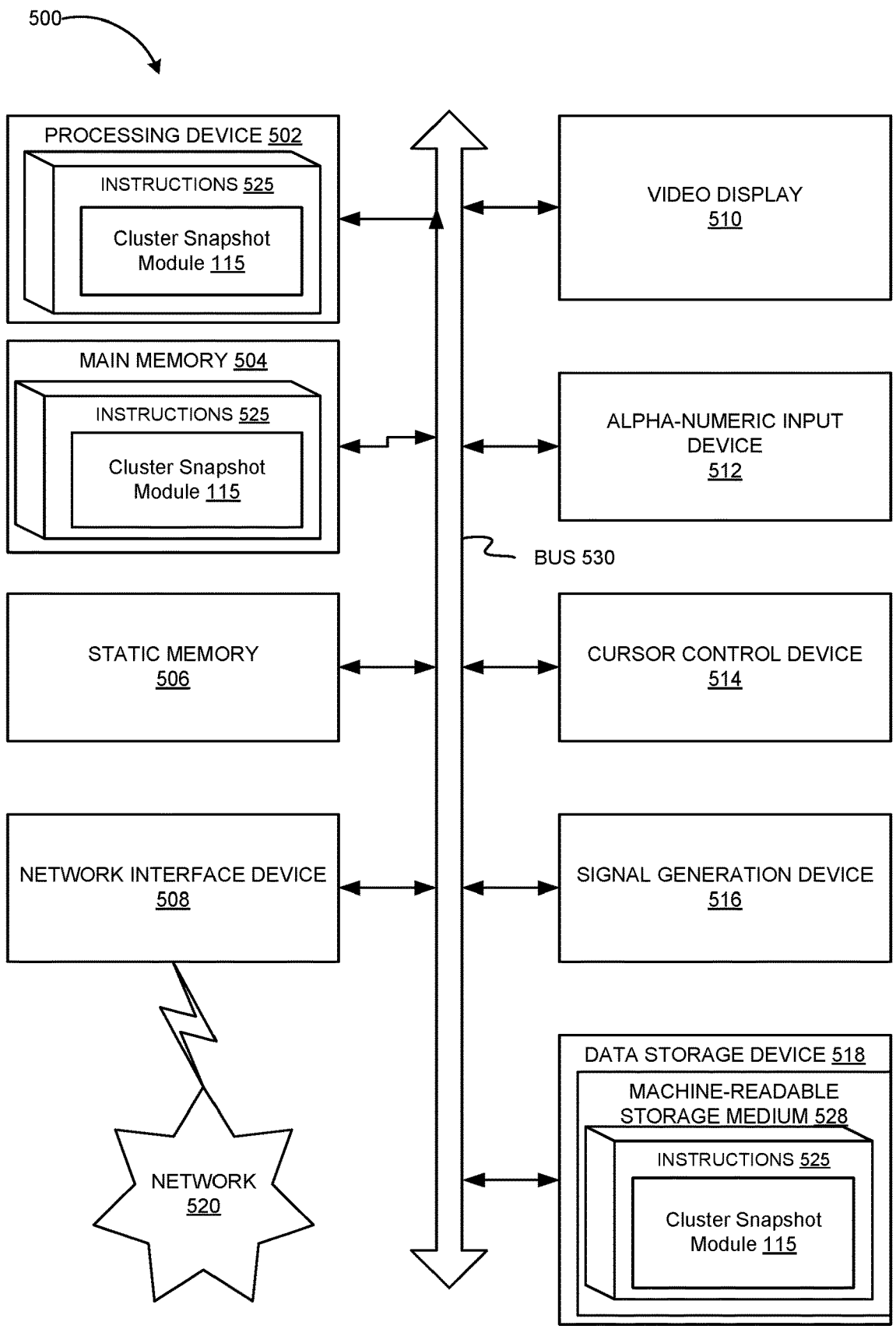
FIG. 5 is a block diagram of an example apparatus that may perform one or more of the operations described herein, in accordance with embodiments of the disclosure.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions 525 that may include instructions for a cluster snapshot module, e.g., cluster snapshot module 115, for carrying out the operations described herein, in accordance with one or more aspects of the present disclosure. Instructions 525 may also reside, completely or at least partially, within main memory 504 and/or within processing device 502 during execution thereof by computing device 500, main memory 504 and processing device 502 also constituting computer-readable media. The instructions 525 may further be transmitted or received over a network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    deploying a containerized execution environment on a cluster of virtual machines, wherein a portion of the containerized execution environment is deployed on each virtual machine in the cluster of virtual machines;
    pausing execution of each of the virtual machines at a first consistent state of the containerized execution environment across the cluster of virtual machines, the first consistent state comprising an operational state of the containerized execution environment as deployed on the cluster of virtual machines;
    performing, by a processing device, a snapshot on each virtual machine in the cluster of virtual machines;
    generating a cluster snapshot by associating the snapshot of each virtual machine in the cluster of virtual machines together into a collection of virtual machine snapshots, wherein the cluster snapshot comprises a first version of the containerized execution environment on the cluster of virtual machines, the first version corresponding to the first consistent state of the containerized execution environment across the cluster of virtual machines;
    performing a test on the containerized execution environment; and
    reverting, by the processing device, each virtual machine of the cluster of virtual machines to the first version of the cluster of virtual machines saved by the cluster snapshot in view of the test.

2. The method of claim 1, further comprising:
    installing one or more additional applications on the containerized execution environment;
    performing an additional snapshot on each virtual machine in the cluster of virtual machines to save a second version of the containerized execution environment with the additional applications;
    performing the test on the second version; and
    reverting each virtual machine to the first or second version in view of the test.

3. The method of claim 1, wherein reverting each virtual machine is performed in response to completion of the test on the containerized execution environment.

4. The method of claim 1, wherein reverting each virtual machine is performed in response to detecting an error state of the containerized execution environment during the test.

5. The method of claim 1, further comprising:
    pausing each virtual machine of the cluster of virtual machines prior to the performing the snapshot.

6. The method of claim 1, wherein reverting to the first version comprises:
    stopping operation of each virtual machine of the cluster of virtual machines;
    reverting each of virtual machine of the cluster of virtual machines to the snapshot of the first version;
    applying a script to the containerized execution environment to remediate any errors in the cluster of virtual machines after reverting the cluster of virtual machines; and
    restarting each virtual machine of the cluster of virtual machines from a state of the virtual machine included in the snapshot.

7. The method of claim 6, wherein applying the script to the containerized execution environment comprises:
    determining whether a network certificate of each of the virtual machines is valid; and
    in response to determining that the network certificate of a virtual machine of the cluster of virtual machines is invalid, issuing and approving a new network certificate for the virtual machine.

8. A system comprising:
    a memory; and
    a processing device operatively coupled to the memory, the processing device to:
        deploy a containerized execution environment on a cluster of virtual machines, wherein a portion of the containerized execution environment is deployed on each virtual machine in the cluster of virtual machines;
        pause execution of each of the virtual machines at a first consistent state of the containerized execution environment across the cluster of virtual machines, the first consistent state comprising an operational state of the containerized execution environment as deployed on the cluster of virtual machines;
        perform a snapshot on each virtual machine in the cluster of virtual machines;
        generate a cluster snapshot by associating the snapshot of each virtual machine in the cluster of virtual machines together into a collection of virtual machine snapshots, wherein the cluster snapshot comprises a first version of the containerized execution environment on the cluster of virtual machines, the first version corresponding to the first consistent state of the containerized execution environment across the cluster of virtual machines;
        perform a test on the containerized execution environment; and
        revert each virtual machine of the cluster of virtual machines to the first version of the cluster of virtual machines saved by the cluster snapshot in view of the test.

9. The system of claim 8, wherein the processing device is further to:
    install one or more additional applications on the containerized execution environment;
    perform an additional snapshot on each virtual machine in the cluster of virtual machines to save a second version of the containerized execution environment with the additional applications;
    perform the test on the second version; and
    revert each virtual machine to the first or second version in view of the test.

10. The system of claim 8, wherein the processing device is to revert each virtual machine in response to completion of the test on the containerized execution environment.

11. The system of claim 8, wherein the processing device is to revert each virtual machine in response to detecting an error state of the containerized execution environment during the test.

12. The system of claim 8, wherein the processing device is further to:
pause each of virtual machine of the cluster of virtual machines prior to performing the snapshot.

13. The system of claim 8, wherein to revert each virtual machine to the first version the processing device is to:
stop operation of each virtual machine of the cluster of virtual machines;
revert each of virtual machine of the cluster of virtual machines to the snapshot of the first version;
apply a script to the containerized execution environment to remediate any errors in the cluster of virtual machines after reverting the cluster of virtual machines; and
restart each virtual machine of the cluster of virtual machines from a state of the virtual machine included in the snapshot.

14. The system of claim 13, wherein to apply the script to the containerized execution environment, the processing device is to:
determining whether a network certificate of each of the virtual machines is valid; and
in response to determining that the network certificate of a virtual machine of the cluster of virtual machines is invalid, issuing and approving a new network certificate for the virtual machine.

15. A non-transitory computer-readable storage medium including instructions that, when executed by a processing device, cause the processing device to:
deploy a containerized execution environment on a cluster of virtual machines, wherein a portion of the containerized execution environment is deployed on each virtual machine in the cluster of virtual machines;
pause execution of each of the virtual machines at a first consistent state of the containerized execution environment across the cluster of virtual machines, the first consistent state comprising an operational state of the containerized execution environment as deployed on the cluster of virtual machines;
perform, by the processing device, a snapshot on each virtual machine in the cluster of virtual machines;
generate a cluster snapshot by associating the snapshot of each virtual machine in the cluster of virtual machines together into a collection of virtual machine snapshots, wherein the cluster snapshot comprises a first version of the containerized execution environment on the cluster of virtual machines, the first version corresponding to the first consistent state of the containerized execution environment across the cluster of virtual machines;
perform a test on the containerized execution environment; and
revert, by the processing device, each virtual machine of the cluster of virtual machines to the first version of the cluster of virtual machines saved by the cluster snapshot in view of the test.

16. The non-transitory computer-readable storage medium of claim 15, wherein the processing device is further to:
install one or more additional applications on the containerized execution environment;
perform an additional snapshot on each virtual machine in the cluster of virtual machines to save a second version of the containerized execution environment with the additional applications;
perform the test on the second version; and
revert each virtual machine to the first or second version in view of the test.

17. The non-transitory computer-readable storage medium of claim 15, wherein the processing device is to revert each virtual machine in response to completion of the test on the containerized execution environment.

18. The non-transitory computer-readable storage medium of claim 15, wherein the processing device is to revert each virtual machine in response to detecting an error state of the containerized execution environment during the test.

19. The non-transitory computer-readable storage medium of claim 15, wherein the processing device is further to:
pause each virtual machine of the cluster of virtual machines prior to performing the snapshot.

20. The non-transitory computer-readable storage medium of claim 15, wherein to revert each virtual machine to the first version the processing device is to:
stop operation of each virtual machine of the cluster of virtual machines;
revert each of virtual machine of the cluster of virtual machines to the snapshot of the first version;
apply a script to the containerized execution environment to remediate any errors in the cluster of virtual machines after reverting the cluster of virtual machines; and
restart each virtual machine of the cluster of virtual machines from a state of the virtual machine included in the snapshot.

* * * * *